United States Patent [19]

Kimber et al.

[11] 4,232,849

[45] Nov. 11, 1980

[54] DRILL BOOM ARRANGEMENT

[75] Inventors: Erich V. Kimber, Handen; Axel L. Lundström, Hägersten, both of Sweden

[73] Assignee: Atlas Copco Aktiebolag, Nacka, Sweden

[21] Appl. No.: 28,662

[22] Filed: Apr. 10, 1979

[30] Foreign Application Priority Data

Apr. 11, 1978 [SE] Sweden ................................ 7804051

[51] Int. Cl.[3] ................................................ F16M 1/00

[52] U.S. Cl. ........................................ 248/654; 173/43

[58] Field of Search ............... 248/654, 666, 647, 652, 248/653; 173/38, 43, 42, 28

[56] References Cited

U.S. PATENT DOCUMENTS

| | | | |
|---|---|---|---|
| 2,791,399 | 5/1957 | Curtis et al. | 173/43 X |
| 3,226,064 | 12/1965 | Thompson | 173/43 |
| 3,304,033 | 2/1967 | Thompson | 173/43 X |
| 3,462,103 | 8/1969 | Strom | 173/43 X |
| 3,481,409 | 12/1969 | Westerlund | 173/43 |
| 3,712,385 | 1/1973 | Hunt | 173/43 |
| 3,828,862 | 8/1974 | Dabell | 173/43 |
| 3,889,906 | 6/1975 | Kimber | 248/654 |
| 3,923,276 | 12/1975 | Kimber | 248/654 |
| 3,980,142 | 9/1976 | Grigoriev | 173/43 |
| 3,982,715 | 9/1976 | Lindgren | 248/654 |

*Primary Examiner*—J. Franklin Foss

*Attorney, Agent, or Firm*—Frishauf, Holtz, Goodman & Woodward

[57] ABSTRACT

A drill boom arrangement comprises a boom proper (10) that is universally pivotably mounted on a support plate (13). The boom is swingable by means of two hydraulic cylinders (16, 17) that are coupled between the support plate and the boom to form a tripod with the boom. The hydraulic cylinders are located on each side of a vertical plane through the boom. A boom head (24) is universally pivotably mounted on the outer end of the boom (10) and it carries a feed beam (40) for a rock drill (41). The boom head is swingable by means of two hydraulic cylinders (27, 28) that are coupled between the boom and the boom head to form another tripod with the boom. These two tripods have similar geometry but the hydraulic cylinders of one tripod is located under the boom and the hydraulic cylinders of the other tripod is located above the boom. The left hand hydraulic cylinder of one tripod is hydraulically coupled in series with the right hand hydraulic cylinder of the other tripod and vice versa so as to provide for parallel displacement of the feed beam when the boom is being swung.

34 Claims, 8 Drawing Figures

DRILL BOOM ARRANGEMENT

This invention relates to a drill boom arrangement with hydraulic parallel motion means for positioning an elongated rock drilling apparatus to different drilling positions with respect to a boom support.

There are prior art drill boom arrangements that incorporate a boom pivoted at the rear end thereof on the boom support for lateral and vertical swinging by means of a hydraulic cylinder (lift cylinder) for swinging the boom vertically and a hydraulic cylinder (swing cylinder) for swinging the boom laterally. A boom head carries the elongated rock drilling apparatus and is pivotably carried by the forward end of the boom for vertical and lateral swinging by means of a hydraulic cylinder for swinging the boom head and rock drilling apparatus vertically (tilt cylinder) and a hydraulic cylinder (swing cylinder) for swinging it laterally. The hydraulic lift cylinder of the boom is connected to the hydraulic tilt cylinder of the boom head and the hydraulic swing cylinder of the boom is connected to the hydraulic swing cylinder of the boom head in order to maintain parallel displacement of the elongated rock drilling apparatus during positioning. A drill boom arrangement of the above mentioned type is disclosed in Canadian Pat. No. 886,975.

It is an object of the invention to provide a drill boom arrangement which provides for parallel movement of the rock drilling apparatus and which holds the rock drilling apparatus very stable in position. Another object is to provide a slim and compact drill boom arrangement.

The above and other purposes of the invention will become obvious from the following description and from the accompanying drawings in which one embodiment of the invention is illustrated by way of example. It should be understood that this embodiment is only illustrative of the invention and that various modifications thereof may be made within the scope of the accompanying claims.

DETAILED DESCRIPTION

Figure 1:
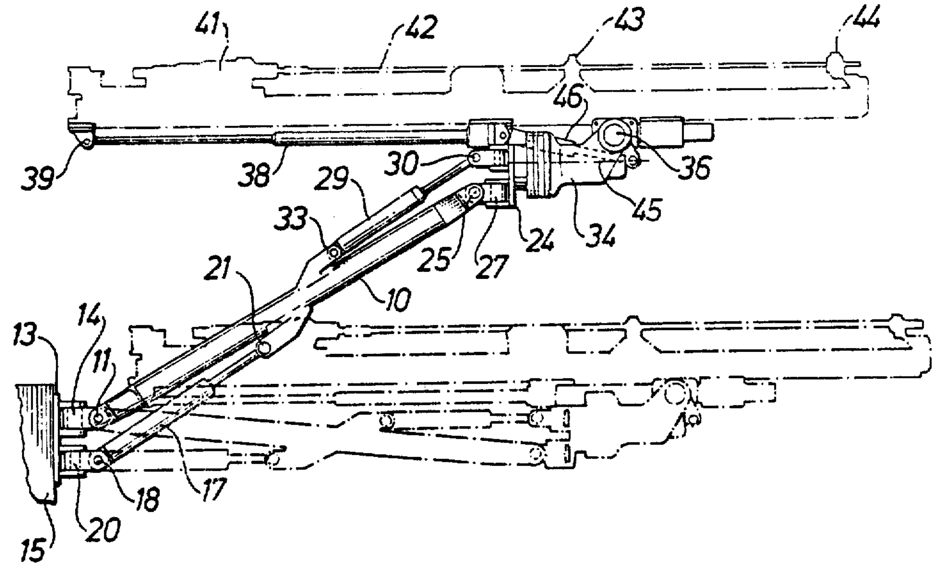
FIG. 1 shows a side view of a boom in two alternative positions in which the invention is applied.
Figure 2:
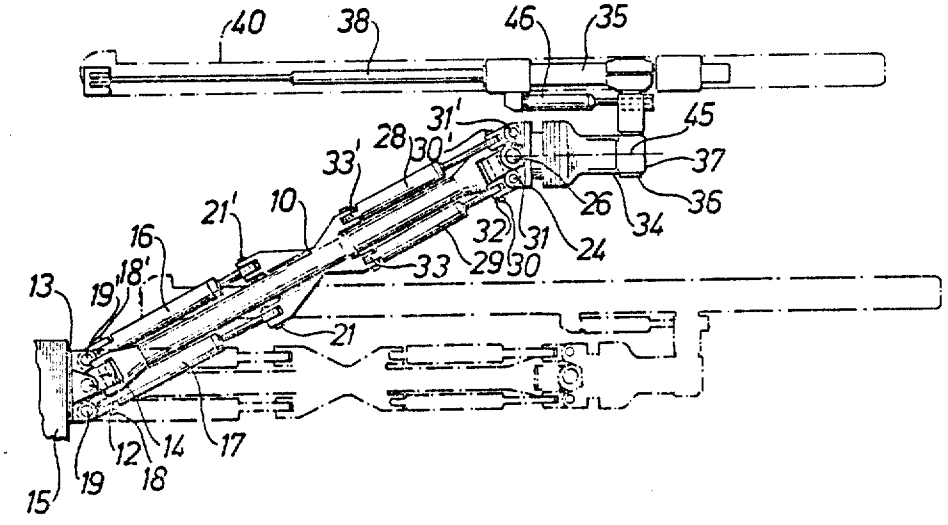
FIG. 2 is a top view of the boom in FIG. 1 in two alternative positions.

In FIGS. 1 and 2 a boom 10 is pivotally supported on a horizontal cross shaft 11 and a vertical cross shaft 12 which are carried by a boom support or bracket 13. The horizontal cross shaft 11 is journalled in a link 14 which is swingable together with the boom 10 about the vertical cross shaft 12. The boom support 13 is carried by an element 15 which forms part of a drill wagon or rig, not shown, on which several booms 10 can be mounted in a group.

The boom is swingable about the cross shafts 11, 12 by means of hydraulic lift and swing cylinders 16, 17. The cylinder 17 is pivotable about a horizontal cross shaft 18 and a vertical cross shaft 19 which are carried by the boom support 13. The horizontal cross shaft 18 is journalled in a link 20 which is swingable together with the cylinder 17 about the vertical cross shaft 19. The end of the piston rod of the cylinder 17 is pivotally connected to the boom 10 by means of a universal joint 21, which comprises a ball on a shaft. The cylinder 16 is connected to the boom support 13 and the boom 10 in the same manner as the cylinder 17. The cross shafts associated with the cylinder 16 are designated $18^1$, $19^1$, $21^1$. The cylinders 16, 17 are of equal size and have the same mounting geometry relative to the boom support 13 and the boom 10.

Due to the fact that the boom support 13 carries the cylinder 17 for swinging about the vertical shaft 19 which is laterally spaced from the vertical swinging plane of the boom 10 a variation in length of solely the cylinder 17 will cause the boom 10 to swing about both the vertical shaft 12 and the horizontal shaft 11.

An extension or contraction of the cylinders 16, 17 of equal amount causes the boom 10 to swing only about the horizontal cross shaft 11. An extension of the cylinder 17 and a contraction of the cylinder 16 of equal amount or vice versa causes the boom 10 to swing about only the vertical cross shaft 12. By differently varying the lengths of the cylinders 16, 17 the boom 10 will simultaneously swing about both cross shafts 11, 12.

In the illustrated embodiment the length of the boom 10 is fixed. The invention may, however, be applied also in extension booms, for instance of the type disclosed in U.S. Pat. No. 3,923,276.

The boom 10 carries a boom head 24. The boom head 24 is pivotally supported by the boom on a horizontal shaft 25 and a vertical shaft 26. The horizontal shaft 25 is journalled in a link 27 which is swingable together with the boom 10 about the vertical shaft 26.

The boom head 24 is swingable about the cross shafts 25, 26 by means of hydraulic tilt and swing cylinders 28, 29. The end of the piston rod of the cylinder 29 is swingable about a horizontal cross shaft 30 and a vertical cross shaft 31 which are carried by the boom head 24. The horizontal cross shaft 30 is journalled in a link 32 which is swingable together with the cylinder 29 about the vertical cross shaft 31. The cylinder 29 is pivotally connected to the boom 10 by means of a universal joint 33, such as a ball joint. The cylinder 28 is connected to the boom head 24 and the boom 10 in the same manner as the cylinder 29. The cross shafts associated with the cylinder 28 are designated $30^1$, $31^1$, $33^1$. The cylinders 28, 29 are of equal size and have the same mounting geometry relative to the boom head 24 and the boom 10.

Due to the fact that the vertical swinging axis of the cylinder 29 is laterally spaced from the vertical swinging plane of the boom head 24 a variation in length of solely the cylinder 29 will cause the boom head 24 to swing about both the vertical shaft 26 and the horizontal shaft 25.

An extension or contraction of the cylinders 28, 29 of equal amount causes the boom head 24 to swing only about the horizontal cross shaft 25. An extension of the cylinder 29 and a contraction of the cylinder 28 of equal amount or vice versa causes the boom head 24 to swing only about the vertical cross shaft 26. By differently varying the lengths of the cylinders 28, 29 the boom head 24 will simultaneously swing about both cross shafts 25, 26.

The boom head 24 carries a turning device 34. The turning device 34 can be of the type disclosed in U.S. Pat. No. 3,563,321. Since the construction of the turning device is not essential to the invention it is not described in detail.

A feed beam holder 35 is pivotally journalled in a casing 37 by means of a cross shaft 36. The casing 37 is coupled to the propeller shaft of the turning device 34. The feed beam holder 35 carries an elongated rock drilling apparatus which includes a feed beam 40 that supports a rock drill 41. The feed beam includes hydraulic power means for displacing the drill along the feed beam in a conventional manner. The rock drill 41 rotates a drill steel 42 and delivers longitudinal impacts on the drill steel. The drill steel 42 is guided by means of drill steel centralizers 43, 44. A hydraulic feed extension cylinder 38 for displacing the feed beam 40 is fixed to the feed beam holder 35 and it is also fixed to a bracket 39 which in its turn is fixed in the feed beam 40. The feed beam 40 is supported slidably in the longitudinal direction thereof on the feed beam holder 35 by means of guides fixed thereon. By extension or contraction of the feed extension cylinder 38 the feed beam 40 can be adjusted longitudinally with respect to the boom 10.

Figure 3:
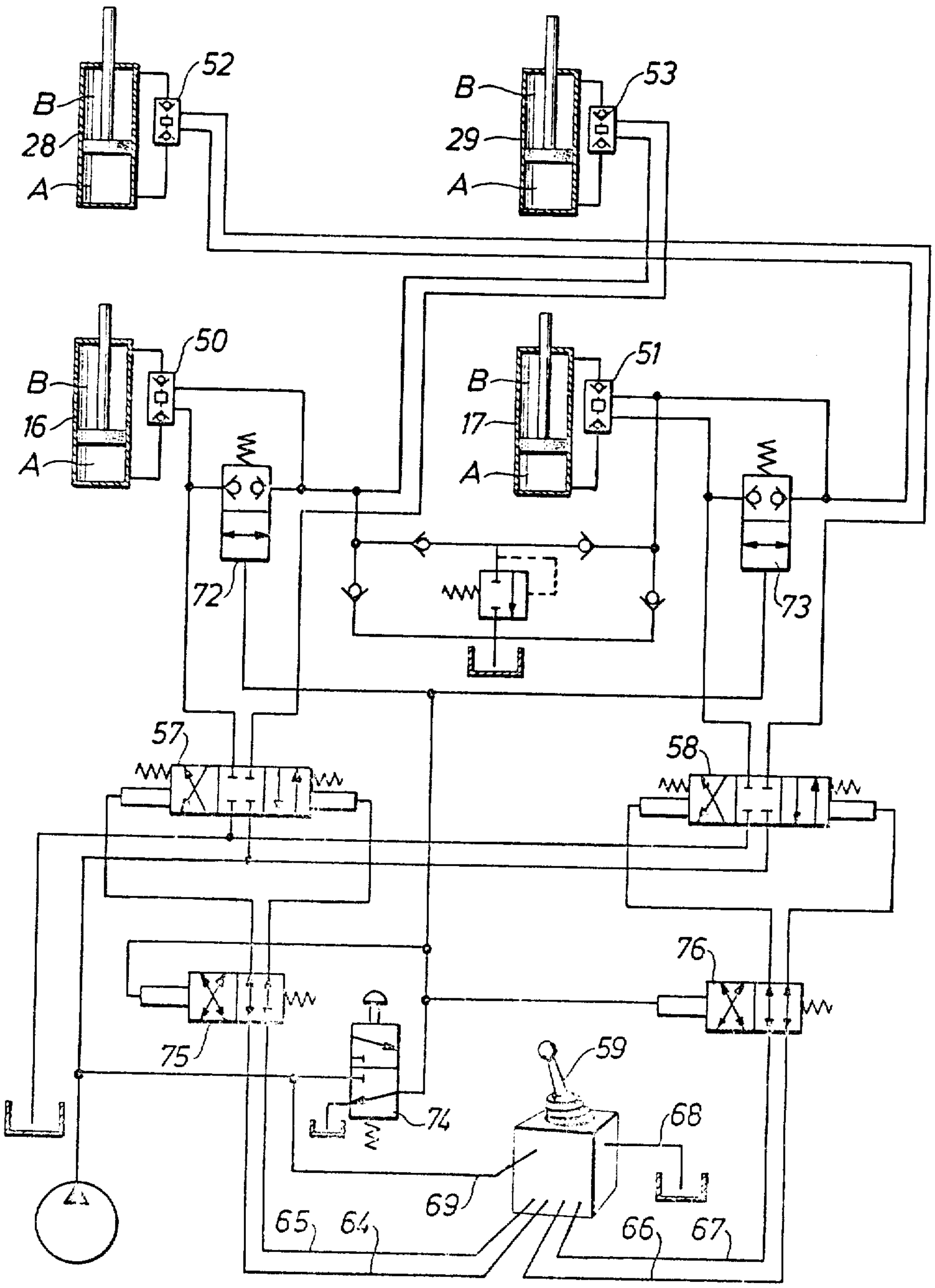
FIG. 3 shows hydraulic circuitry for parallel displacement and operating of the boom in FIGS. 1 and 2.
Figure 4:
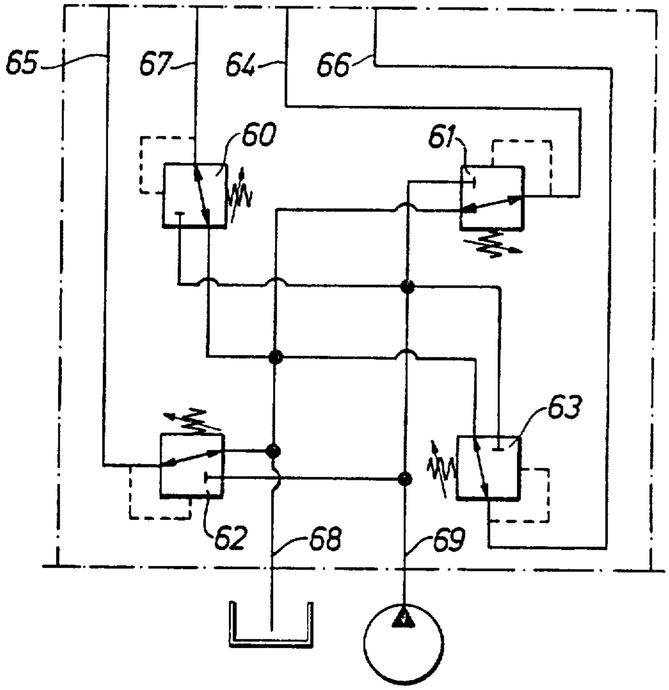
FIG. 4 shows the fundamental construction of a manually one-handedly controlled operating lever according to the invention for actuation of control valves associated with the hydraulic cylinder means.
Figure 5:
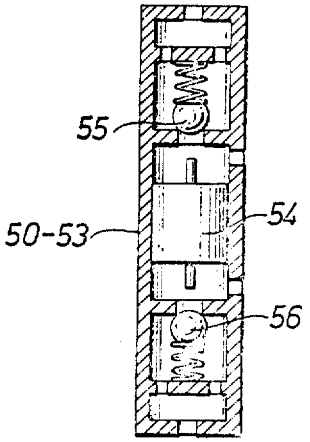
FIG. 5 shows the fundamental construction of hydraulic locks included in the hydraulic circuitry in FIG. 3.

By actuating the turning device 34 the feed beam 40 can be rotated 360° about an axis 45. The feed beam 40 can be swung by means of a hydraulic cylinder 46 about the cross shaft 36 to a position substantially perpendicular to the axis 45. The hydraulic circuitry for controlling the cylinders 16, 17, 28, 29 is illustrated in FIGS. 3–5. It provides for parallel displacement of the feed beam 40 during positioning of the boom, i.e. the swinging movement of the feed beam 40 on the boom 10 is opposite to the swinging movement of the boom on the boom support 13.

As is evident from the circuitry in FIG. 3 each of the cylinders 16, 17, 28, 29 is provided with a hydraulic lock 50, 51, 52, and 53 respectively. The hydraulic locks are of conventional type, e.g. pilot operated double check valves provided with a reversing piston 54 which cooperates with a couple of check valves 55, 56 as is evident from FIG. 5. Through the hydraulic locks 50 and 53 the smaller cylinder chamber B of the cylinder 16 is connected to the larger cylinder chamber A of the cylinder 29. Through the hydraulic locks 51 and 52 the smaller cylinder chamber B of the cylinder 17 is connected to the larger cylinder chamber A of the cylinder 28. Through the connection between the chambers A and B the cylinder 16 becomes one-sidedly hydraulically bound to the cylinder 29 and the cylinder 17 one-sidedly hydraulically bound to the cylinder 28.

A common direction control valve 57 is coupled to the larger cylinder chamber A of the cylinder 16 and to the larger A and smaller B cylinder chambers of the cylinder 29 in order to control the cylinders 16, 29. A common direction control valve 58 is coupled to the larger cylinder chamber A of the cylinder 17 and to the larger and smaller cylinder chambers A and B respectively of the cylinder 28. Thus, the cylinders 17 and 28 are coupled in series to the direction control valve 58 and the cylinders 16 and 29 are coupled in series to the direction control valve 57.

The direction control valves 57, 58 are actuated by means of a manually one-hand controlled operating means 59. The operating means 59 is a lever of coordinate-type known per se (Joy-stick). Four normally closed pressure reducing pilot valves 60, 61, 62, 63 can be steplessly variably adjusted between a closed and a fully open position by means of the lever 59. The function is diagrammatically illustrated in FIGS. 4 and 6. When the pilot valves 60–63 are in a closed position the signal conduits 64–67 of the control valves 57, 58 are connected to tank through a conduit 68. The valves 60–63 are adjusted proportionally to the deflection of the lever 59 by means of a rod 70 and spring means 71. It is possible to either adjust only one of the valves 60–63 by means of the lever 59, or adjust two adjacent valves simultaneously, i.e. any of the valve-couples 62, 63; 63, 61; 61, 60 and 60, 62. Hydraulic fluid is supplied to the signal conduits 64–67 through a supply conduit 69.

Suppose that the common control valve 57 in FIG. 3 is moved to the right from its neutral position. Then, the chamber A of the cylinder 16 is pressurized. The reversing piston 54 opens the opposite check valve 55 of the hydraulic lock 50, thereby connecting chamber B of the cylinder 16 with the chamber A of the cylinder 29. Because of this, a one-sided connection arises between the cylinders 16, 29 which is utilized to parallel-displace the feed beam 40 for instance to the position shown in FIGS. 1 and 2 by dash and dot lines from the initial position shown by unbroken lines. During the one-sidedly bound movement, the chamber B of the cylinder 29 is contracted since it is open to low pressure via the check valve 55 of the hydraulic lock 53 and the control valve 57.

When the control valve 57 is moved to the left in FIG. 3 the chamber B of the cylinder 29 is pressurized. The cylinder 29 then forces fluid from its chamber A to the chamber B in the cylinder 16. The cylinder 16 is then contracted since its chamber A is open to low pressure via the check valve 56 of the hydraulic lock 50 and the direction control valve 57.

The cylinders 17, 28 are extended and contracted by means of the direction control valve 58 in the same manner.

The requirements which must be met in order to obtain an exact parallel displacement of the feed beam 40 during swinging of the boom 10 are that a triangle $T_1$ having its corners on the horizontal swinging axes 11, 18, 21 and 11, $18^1$, $21^1$, respectively, is similar to a triangle $T_2$ having its corners on the horizontal swinging axes respectively 25, $30^1$, $33^1$ and 25, 30, 33, and that a triangle $T_3$ having its corners on the vertical swinging axes 12, 19, 21 and 12, $19^1$, $21^1$, respectively, is similar to a triangle $T_4$ having its corners on the vertical swinging axes respectively 26, $31^1$, $33^1$ and 26, 31, 33. If the hydraulic fluid in the chambers B of the cylinders 16, 17 is transferred directly and unchanged to the chambers A of the cylinders 28, 29, then the ratio of the annular piston area in the chambers B of the cylinders 16, 17 to the piston area in the chambers A of the cylinders 28, 29 must be equal with the similarity ratios $T_2$:$T_1$ and $T_4$:$T_3$.

Specifically, all the cylinders 16, 17, 28, 29 can be of equal size. The triangles $T_1$ and $T_3$ are then congruent with the triangles $T_2$ and $T_4$, respectively. Due to the fact that the chambers A and B are of different size it is necessary to include a compensation device in the circuitries for parallel displacement. This compensation device has to accumulate or deliver surplus fluid dependent on whether the cylinders are contracted or extended.

According to the invention it is possible to simultaneously swing the boom 10 laterally and vertically by means of the lever 59. It is also possible to simultaneously swing the boom head 24 laterally and vertically by means of the lever 59 without swinging the boom 10. Due to this the feed beam 40 can be rapidly adjusted into a desired drilling position by means of a single operating means.

Figure 6:
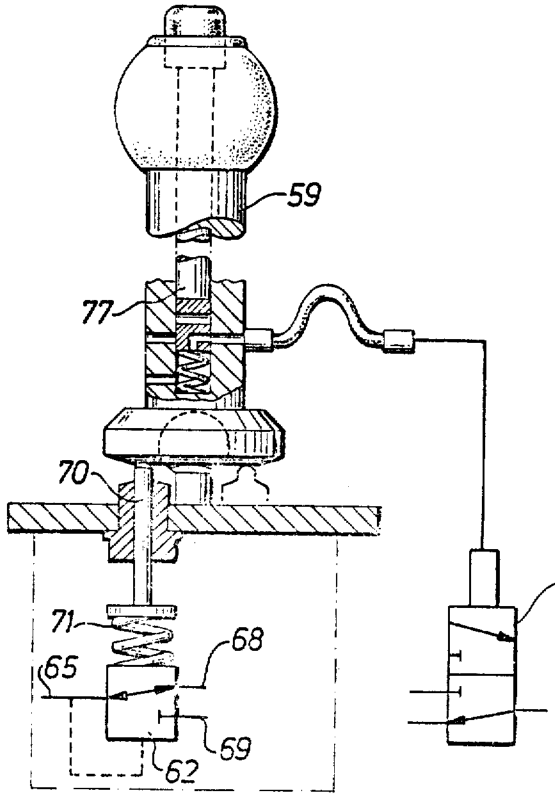
FIG. 6 shows partly in section diagrammatically the one-handedly controlled operating lever.

During swinging of solely the feed beam 40 the two chambers A and B of the cylinders 16, 17 are short-circuited by means of valves 72, 73. The valves 72, 73 are shifted by means of a pilot valve 74. In order to simplify the actuation of the valve 74, it can either be built-in in the operating lever 59 or be remotely controlled by means of another valve 77 which is built-in in the lever 59, as illustrated in FIG. 6. Means are also provided to ensure that, when the pilot valves 60–63 are actuated, the feed beam 40 is swung in the same direction by means of the cylinders 28, 29 when the cylinders 16, 17 are short-circuited as the boom 10 is swung by means of the cylinders 16, 17. This is effected by means of valves 75, 76 which cross-connect the two pilot lines 64, 65 and the two pilot lines 66, 67 respectively and thus reverse the action of the direction control valves 57, 58 when the valve 74 is actuated. As can be seen in FIG. 3 the valve 74 actuates the valves 72, 73 and the valves 75, 76 simultaneously.

Figure 7:
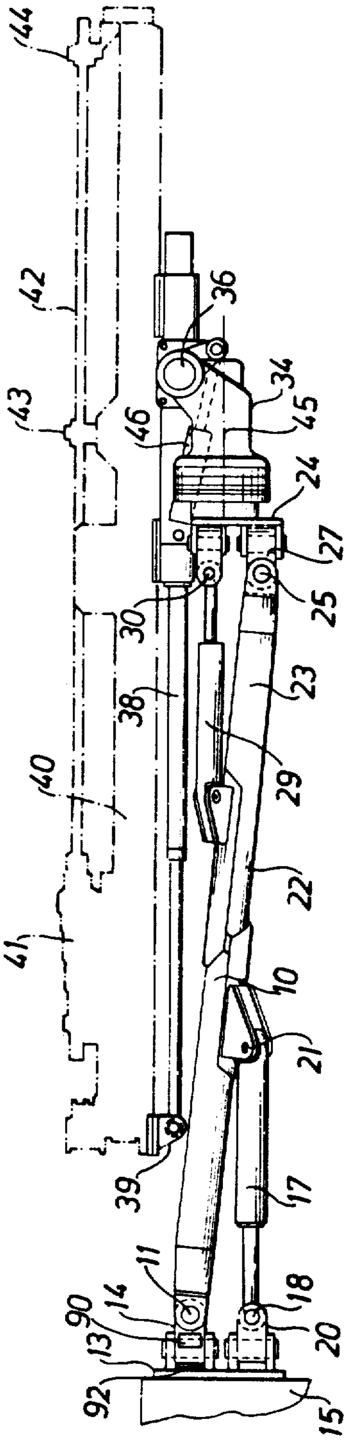
FIGS. 7 and 8 are views corresponding to FIGS. 1 and 2 but showing a somewhat modified embodiment.
Figure 8:
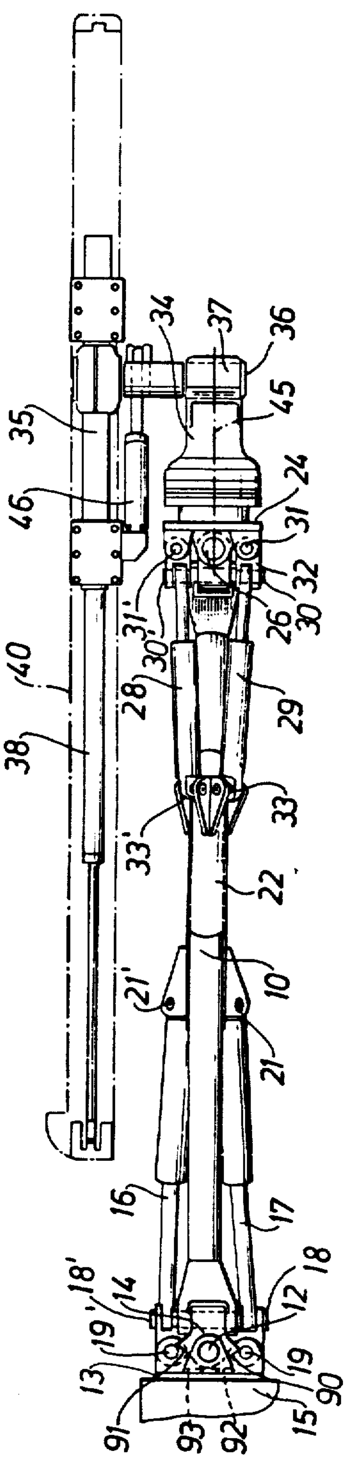

In FIGS. 7 and 8, elements corresponding to elements in the preceding figures have been given the same numerals as in the preceding figures. In the modified embodiment shown in FIGS. 7 and 8, the cylinders 16, 17, and 28, 29 have been turned so that the cylinders are coupled to the four joints 21, 21[1], 33, 33[1] and the piston rods of the cylinders are coupled to the four horizontal cross shafts 18 and 32. This mounting permits a wider angle of swinging of the boom 10 although the support plate 13 is not bigger. The link 14 has two lugs 90, 91 that will engage two stops 92, 93 on the support plate 13 to limit the horizontal swinging movement of the boom so that the piston rods of the cylinders 16, 17 cannot be forced against the boom 10 and destroyed. There are similar stops on the boom head.

The two shown embodiments are only illustrative of the invention. As examples of possible amendments can be mentioned that all joints associated with the boom and the cylinders can be constructed as ball joints.

We claim:

1. A drill boom arrangement with hydraulic parallel motion means for positioning an elongated rock drilling apparatus (40,41) to different drilling positions with respect to a boom support, comprising:

- a boom support (13);
- a boom (10) pivoted at the rear end thereof on a first universal joint (11,12) for lateral and vertical swinging;
- first (17) and second (16) hydraulic cylinder means pivotally connected between said boom (10) and support (13) for swinging said boom;
- a boom head (24) carrying said elongated rock drilling apparatus (40,41) and pivoted at the forward end of said boom (10) on a second universal joint (25,26) for lateral and vertical swinging;
- third (28) and fourth (29) hydraulic cylinder means for swinging said boom head (24) and rock drilling apparatus (40,41);
- a third universal joint (18,19) arranged on one side of the vertical swinging plane of the boom (10);
- said boom support (13) carrying said first hydraulic cylinder means (17) for swinging about said third universal joint (18,19);
- a fourth universal joint (30′,31′) arranged on the other side of the vertical swinging plane of the boom (10);
- said third hydraulic cylinder means (28) being pivotally connected to said boom head (24) for swinging about said fourth universal joint (25,31);
- a fifth universal joint (18′,19′);
- said boom support (13) carrying said second hydraulic cylinder means (16) for swinging about said fifth universal joint (18′,19′);
- a sixth universal joint (30,31) on the opposite side of the vertical swinging plane of the boom (10) with respect to said fifth universal joint;
- said fourth hydraulic cylinder means (29) being pivotally connected to said boom head (24) for swinging about said sixth universal joint (30,31);
- a hydraulic circuit including conduit means connecting said first hydraulic cylinder means (17) with said third hydraulic cylinder means (28) for hydraulically slave coupling thereof and conduit means connecting said second hydraulic cylinder means (16) with said fourth hydraulic cylinder means (29) for hydraulically slave coupling thereof whereby to maintain substantially parallel displacement of said rock drilling apparatus (40,41) during positioning thereof.

2. A drill boom arrangement according to claim 1 in which said first hydraulic cylinder means (17) is one-sidedly hydraulic slave coupled to said third hydraulic cylinder means (28), and said second hydraulic cylinder means (16) is one-sidedly hydraulic slave coupled to said fourth hydraulic cylinder means (29), and comprising means for alternately pressurizing the mutually unbound chambers of said hydraulic cylinder means.

3. A drill boom arrangement according to claim 1 in which a first triangle having its corners on horizontal swinging axes (11, 18, 21) between the drill boom (10), the boom support (13) and the first hydraulic cylinder means (17) is similar to a second triangle having its corners on horizontal swinging axis (25, 30[1], 33[1]) between the drill boom (10), the boom head (24) and the third hydraulic cylinder means (28), the similarity being maintained during swinging of the drill boom.

4. A drill boom arrangement according to claim 3 in which a third triangle having its corners on vertical swinging axes (12, 19, 21) between the drill boom (10), the boom support (13) and the first hydraulic cylinder means (17) is similar to a fourth triangle having its corners on vertical swinging axes (26, 31[1], 33[1]) between the drill boom (10), the boom head (24) and the third hydraulic cylinder means (28), the similarity being maintained during swinging of the drill boom.

5. A drill boom arrangement according to claim 1 in which said first and second hydraulic cylinder means (17, 16) are of equal size and have the same mounting geometry relative to the drill boom (10) and the boom support (13).

6. A drill boom arrangement according to claim 5 in which said third and fourth hydraulic cylinder means (28, 29) are of equal size and have the same mounting geometry relative to the drill boom (10) and the boom head (24).

7. A drill boom arrangement according to claim 6 in which said first, second, third and fourth hydraulic cylinder means all are of equal size.

8. A drill boom arrangement according to claim 2 in which a first common control valve (58) is coupled to the mutually unbound chambers of the first (17) and third (28) hydraulic cylinder means.

9. A drill boom arrangement according to claim 8 comprising a second common control valve (57) coupled to the mutually unbound chambers of the second (16) and fourth (29) hydraulic cylinder means.

10. A drill boom arrangement according to claim 9 comprising a common operating lever (59) coupled to said first and second control valves (58,57) for simultaneous actuation of said control valves (58,57).

11. A drill boom arrangement according to claim 10, comprising a first valve means (73) coupled between said first control valve (58) and said first (17) and third (28) hydraulic cylinder means, said first valve means (73) being adapted to either allow pressurization of one of the mutual unbound chambers of said first (17) and third (28) hydraulic cylinder means or, upon adjustment, allow pressurization of one of the chambers of said third hydraulic cylinder means (28).

12. A drill boom arrangement according to claim 11, comprising a second valve means (76) which is adapted to reverse the direction of the hydraulic fluid flow to the third hydraulic cylinder means (28) when the first valve means (73) is adjusted.

13. A drill boom arrangement according to claim 12 comprising a second operating means (74) for controlling said first (73) and second (76) valve means.

14. A drill boom arrangement according to claim 13 comprising a third valve means (72) coupled between said second control valve (57) and said second (16) and fourth (29) hydraulic cylinder means, said third valve means being adapted to either allow pressurization of one of the mutual unbound chambers of said second (16) and fourth (29) hydraulic cylinder means or, upon adjustment, allow pressurization of one of the chambers of said fourth hydraulic cylinder means (29).

15. A drill boom arrangement according to claim 14 comprising a fourth valve means (75) which is adapted to reverse the direction of the hydraulic fluid flow to the fourth hydraulic cylinder means (29) when the third valve means (72) is adjusted.

16. A drill boom arrangement according to claim 15 in which said third (72) and fourth (75) valve means are controlled by said second operating means (74).

17. A drill boom arrangement according to claim 16 in which said second operating means (74) is built-in in said common operating lever (59).

18. A drill boom arrangement with hydraulic parallel motion means for positioning an elongated rock drilling apparatus (40,41) to different drilling positions with respect to a boom support, comprising:

- a boom support (13);
- a boom (10) pivoted at the rear end thereof on a first universal joint (11,12) for lateral and vertical swinging;
- first (17) and second (16) hydraulic cylinder means pivotally connected between said boom (10) and support (13) for swinging said boom;
- a boom head (24) carrying said elongated rock drilling apparatus (40,41) and pivoted at the forward end of said boom (10) on a second universal joint (25;26) for lateral and vertical swinging;
- third (28) and fourth (29) hydraulic cylinder means for swinging said boom head (24) and rock drilling apparatus (40,41);
- a third universal joint (18,19) coupled to said boom support (13), said boom support (13) carrying said first hydraulic cylinder means (17) for swinging about said third universal joint (18,19);
- a fourth universal joint (30',31') coupled to said boom head (24), said third hydraulic cylinder means (28) being pivotally connected to said boom head (24) for swinging about said fourth universal joint (25, 31);
- a hydraulic circuit including conduit means one-sidedly connecting said first hydraulic cylinder means (17) with said third hydraulic cylinder means (28) for hydraulically slave coupling thereof and conduit means one-sidedly connecting said second hydraulic cylinder means (16) with said fourth hydraulic cylinder means (29) for hydraulically slave coupling thereof whereby to maintain substantially parallel displacement of said rock drilling apparatus (40,41) during positioning thereof; and
- means for alternately pressurizing the mutually unbound chambers of said hydraulic cylinder means.

19. A drill boom arrangement according to claim 18 in which a first triangle having its corners on horizontal swinging axes (11, 18, 21) between the drill boom (10), the boom support (13) and the first hydraulic cylinder means (17) is similar to a second triangle having its corners on horizontal swinging axis (25, $30^1$, $33^1$) between the drill boom (10), the boom head (24) and the third hydraulic cylinder means (28), the similarity being maintained during swinging of the drill boom.

20. A drill boom arrangement according to claim 19 in which a third triangle having its corners on vertical swinging axes (12, 19, 21) between the drill boom (10), the boom support (13) and the first hydraulic cylinder means (17) is similar to a fourth triangle having its corners on vertical swinging axes (26, $31^1$, $33^1$) between the drill boom (10), the boom head (24) and the third hydraulic cylinder means (28), the similarity being maintained during swinging of the drill boom.

21. A drill boom arrangement according to claim 18 in which said first and second hydraulic cylinder means (17, 16) are of equal size and have the same mounting geometry relative to the drill boom (10) and the boom support (13).

22. A drill boom arrangement according to claim 21 in which said third and fourth hydraulic cylinder means (28,29) are of equal size and have the same mounting geometry relative to the drill boom (10) and the boom head (24).

23. A drill boom arrangement according to claim 22 in which said first, second, third and fourth hydraulic cylinder means all are of equal size.

24. A drill boom arrangement according to claim 18 in which a first common control valve (58) is coupled to the mutually unbound chambers of the first (17) and third (28) hydraulic cylinder means.

25. A drill boom arrangement according to claim 24 comprising a second common control valve (57) coupled to the mutually unbound chambers of the second (16) and fourth (29) hydraulic cylinder means.

26. A drill boom arrangement according to claim 25 comprising a common operating lever (59) coupled to said first and second control valves (58,57) for simultaneous actuation of said control valves (58, 57).

27. A drill boom arrangement according to claim 26, comprising a first valve means (73) coupled between said first control valve (58) and said first (17) and third (28) hydraulic cylinder means, said first valve means (73) being adapted to either allow pressurization of one of the mutual unbound chambers of said first (17) and third (28) hydraulic cylinder means or, upon adjustment, allow pressurization of one of the chambers of said third hydraulic cylinder means (28).

28. A drill boom arrangement according to claim 27, comprising a second valve means (76) which is adapted to reverse the direction of the hydraulic fluid flow to the third hydraulic cylinder means (28) when the first valve means (73) is adjusted.

29. A drill boom arrangement according to claim 28 comprising a second operating means (74) for controlling said first (73) and second (76) valve means.

30. A drill boom arrangement according to claim 29 comprising a third valve means (72) coupled between said second control valve (57) and said second (16) and fourth (29) hydraulic cylinder means, said third valve means being adapted to either allow pressurization of one of the mutual unbound chambers of said second (16) and fourth (29) hydraulic cylinder means or, upon adjustment, allow pressurization of one of the chambers of said fourth hydraulic cylinder means (29).

31. A drill boom arrangement according to claim 30 comprising a fourth valve means (75) which is adapted to reverse the direction of the hydraulic fluid flow to the fourth hydraulic cylinder means (29) when the third valve means (72) is adjusted.

32. A drill boom arrangement according to claim 31 in which said third (72) and fourth (75) valve means are controlled by said second operating means (74).

33. A drill boom arrangement according to claim 32 in which said second operating means (74) is built-in in said common operating lever (59).

34. A drill boom arrangement according to claim 1 or 18 wherein each of said four cylinders have cylinder ends which are coupled to said boom (10).

* * * * *